(12) United States Patent
Shaw et al.

(10) Patent No.: US 10,523,602 B2
(45) Date of Patent: Dec. 31, 2019

(54) SYSTEM AND METHOD FOR DISTRIBUTING "SEMI-BLIND" ELECTRONIC MESSAGES

(71) Applicant: The Boeing Company, Chicago, IL (US)

(72) Inventors: Wilma Shaw, Seattle, WA (US); Robert L. Steed, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 202 days.

(21) Appl. No.: 14/927,619

(22) Filed: Oct. 30, 2015

(65) Prior Publication Data

US 2017/0126595 A1    May 4, 2017

(51) Int. Cl.
| | |
|---|---|
| *G06F 15/16* | (2006.01) |
| *H04L 12/58* | (2006.01) |
| *G06F 3/0482* | (2013.01) |
| *G06F 3/0484* | (2013.01) |

(52) U.S. Cl.
CPC .......... *H04L 51/046* (2013.01); *G06F 3/0482* (2013.01); *G06F 3/04847* (2013.01); *H04L 51/14* (2013.01)

(58) Field of Classification Search
CPC ...................................................... H04L 65/60
USPC ........................................................ 709/206
See application file for complete search history.

(56) References Cited

U.S. PATENT DOCUMENTS

| | | | |
|---|---|---|---|
| 6,721,785 B1* | 4/2004 | Raghunandan | H04L 51/28 709/204 |
| 9,912,618 B2* | 3/2018 | Lee | H04L 51/04 |
| 2005/0198143 A1* | 9/2005 | Moody | G06Q 10/107 709/206 |
| 2007/0124392 A1* | 5/2007 | Goldberg | G06Q 10/107 709/206 |
| 2007/0130526 A1* | 6/2007 | Allwright | G06Q 10/107 715/752 |

(Continued)

OTHER PUBLICATIONS

United Kingdom Application No. GB1615778.6, Combined Search and Examination Report under Sections 17 & 18(3), dated Mar. 1, 2017.

*Primary Examiner* — Hamza N Algibhah
(74) *Attorney, Agent, or Firm* — Perman & Green, LLP

(57) ABSTRACT

In accordance with one or more aspects, a method for distributing electronic messages, the method includes receiving an electronic message at a transmission server sent from a source device over the network, where the electronic message includes a semi-blind distribution list including members of more than one distribution group, and with the processor parsing the more than one distribution group, formatting a group electronic message for each of the parsed distribution groups based on the electronic message where the group electronic message is formatted such that members of a common distribution group of the more than one distribution group are visible to one another as recipients in the semi-blind distribution list, and transmitting a respective group electronic message to respective remote devices and wherein the members of another distribution group different from the common distribution group are invisible in the respective group electronic message corresponding to the common distribution group.

20 Claims, 11 Drawing Sheets

(56) References Cited

U.S. PATENT DOCUMENTS

| | | | |
|---|---|---|---|
| 2008/0021966 A1* | 1/2008 | Asami | G06Q 10/107 709/206 |
| 2008/0028028 A1* | 1/2008 | Chismark | G06F 17/30613 709/206 |
| 2010/0070592 A1* | 3/2010 | Steuer | G06Q 10/107 709/206 |
| 2011/0225245 A1* | 9/2011 | Bhogal | G06Q 10/107 709/206 |
| 2015/0193530 A1* | 7/2015 | Kadarkarai | H04L 51/02 707/730 |

* cited by examiner

SYSTEM AND METHOD FOR DISTRIBUTING "SEMI-BLIND" ELECTRONIC MESSAGES

FIELD

The aspects of exemplary embodiment generally relate to electronic messaging, more particularly, electronic messaging having one or more "semi-blind" distribution groups.

BACKGROUND

Generally speaking, conventional electronic messaging systems, such as email, text messaging, instant messaging, calendar invitations or social media postings, are very limited in their ability to send electronic messages with "blind distribution lists" where the visibility of recipients on a distribution list can be easily configured by the sender of the electronic message. For example, in conventional electronic messaging systems (using email as an example), a sender can send electronic messages to recipients using the "to:" and "cc:" (i.e. carbon copy or courtesy copy) fields. The "to:" and "cc:" functionalities enable all recipients of the email to see all of the names, identities and email addresses of other recipients of that email. For example, referring to FIG. 2, when an electronic message 201 is sent by a sender 204 with distribution group 202A, distribution group 202B, and distribution group 202C in the "to:" field, the resultant electronic message allows the recipients of distribution groups 202A-202C be visible to each other in a pool of all recipients 205. Unfortunately, those that receive the electronic message 201 also gain access to valuable data (for example, email lists, client lists, or other electronic messaging distribution groups). Conventional electronic messaging systems also provide for messages with recipients listed in the "blind carbon copy" (also known as "BCC") field. However, blind carbon copy prevents the email recipients from seeing the names, identities or email addresses of other recipients in the electronic message. For example, in FIG. 3, a user 304 sends an electronic message 301 with distribution group 302A, distribution group 302B and distribution group 302C listed in the "BCC" field. The resultant electronic message 301 appears to be individually addressed to each individual recipient 305A-C, 306A-B and 307 A-D, without any information about other recipients to the electronic message. Blind carbon copy prevents people within the same organization or the same electronic messaging distribution group from seeing others within their organization or distribution group who received the same electronic message. Blind carbon copy, thus, prevents initiating an intra-organization or intra-distribution group dialogue related to a given email.

Alternatively, a separate electronic message can be sent by a user to each individual receiving company, each using a separate distribution group containing a list of recipients (e.g. names, identities and email addresses). However, as seen in FIG. 4, this results in multiple electronic messages 401A-C being sent to the separate distribution groups (e.g. Groups A-C) for the same message. This is particularly cumbersome for calendar invites (e.g. for a meeting, teleconference, or other event), where the initiator of the meeting would have to maintain multiple calendar entries for each organization that has invitees to the meeting event. Not only is this system confusing, but it is also cumbersome, non-productive and highly inefficient.

It is desirable to have an electronic messaging system which simplifies the process of sending electronic messages to different distribution groups and controlling the visibility of recipients in each distribution group.

SUMMARY

Accordingly, a system and method, intended to address the above-identified concerns, would find utility.

In accordance with one or more aspects of the present disclosure, a method for distributing electronic messages over a network to a remote device, the method includes receiving an electronic message at a transmission server sent from a source device over the network, the transmission server comprising a processor and a memory that stores the electronic message, where the electronic message includes a semi-blind distribution list including members of more than one distribution group, and with the processor parsing the more than one distribution group; formatting a group electronic message for each of the parsed distribution groups based on the electronic message where each group electronic message includes as recipients, members of a respective one of the parsed distribution groups and where the group electronic message is formatted such that members of a common distribution group of the more than one distribution group are visible to one another as recipients in the semi-blind distribution list; and transmitting a respective group electronic message over the network to respective remote devices of the members belonging to the more than one distribution group; and wherein the members of at least another distribution group different from the common distribution group are not visible in the respective group electronic message corresponding to the common distribution group.

In accordance with one or more aspects of the present disclosure, an apparatus for distributing electronic messages over a network to a remote device, the apparatus includes a transmission server configured to receive an electronic message sent from a source device over the network where the electronic message includes a semi-blind distribution list including members of more than one distribution group, the transmission server including a memory that stores the electronic message; and a processor configured to parse the more than one distribution group; format a group electronic message for each of the parsed distribution groups based on the electronic message where each group electronic message includes as recipients, members of a respective one of the parsed distribution groups and where the group electronic message is formatted such that members of a common distribution group of the more than one distribution group are visible to one another as recipients in the semi-blind distribution list; and transmit a respective group electronic message over the network to respective remote devices of the members belonging to the more than one distribution group; and wherein the members of at least another distribution group different from the common distribution group are not visible in the respective group electronic message corresponding to the common distribution group.

In accordance with one or more aspects of the present disclosure, a method for distributing electronic messages from a source device over a network to a remote device, the method includes presenting a user interface on a display of the source device, the source device comprising a memory that stores non-transitory computer readable program code defining the user interface and a processor that executes the non-transitory computer readable program code, the user interface including an address field for specifying a semi-blind distribution list including members of more than one distribution group as recipients; and with the processor receiving a selection of the semi-blind distribution list from the user interface of the source device; receiving message data from the user interface of the source device; formatting an electronic message based on the message data and the selection of the semi-blind distribution list such that members of a common distribution group of the more than one distribution group are visible to one another as recipients in the semi-blind distribution list; and transmitting the electronic message over the network to respective remote devices of members belonging to the more than one distribution group; wherein the members of at least another distribution group different from the common distribution group are not visible in the respective electronic message received by members of the common distribution group.

In accordance with one or more aspects of the present disclosure, an apparatus for distributing electronic messages over a network to a remote device, the apparatus includes a display; a memory that stores non-transitory computer readable program code defining a user interface; and a processor that executes the non-transitory computer readable program code, the processor being configured to present the user interface on the display, the user interface including an address field for specifying a semi-blind distribution list including members of more than one distribution group; receive a selection of the semi-blind distribution list from the user interface, receive message data from the user interface, format an electronic message based on the message data and the selection of the semi-blind distribution list such that members of a common distribution group of the more than one distribution group are visible to one another as recipients in the semi-blind distribution list, and transmit the electronic message over the network to respective remote devices of members belonging to more than one distribution group; wherein the members of at least another distribution group different from the common distribution group are not visible in the respective electronic message received by members of the common distribution group.

In accordance with one or more aspects of the present disclosure, a non-transitory computer readable medium having computer readable program code embodied therein, stored on a memory of a source device, comprising computer readable code that, when executed, performs presenting a user interface on a display of the source device, the source device comprising a communications module, the user interface including an address field for specifying a semi-blind distribution list including members of more than one distribution group as recipients, receiving a selection of the semi-blind distribution list from the user interface of the source device, receiving message data from the user interface of the source device; formatting an electronic message based on the message data and the selection of the semi-blind distribution list such that members of a common distribution group of the more than one distribution group are visible to one another as recipients in the semi-blind distribution list, and transmitting the electronic message over the network to respective remote devices of members belonging to the more than one distribution group wherein the members of at least another distribution group different from the common distribution group are not visible in the respective electronic message corresponding to the common distribution group.

BRIEF DESCRIPTION OF THE DRAWINGS

Figure 1:
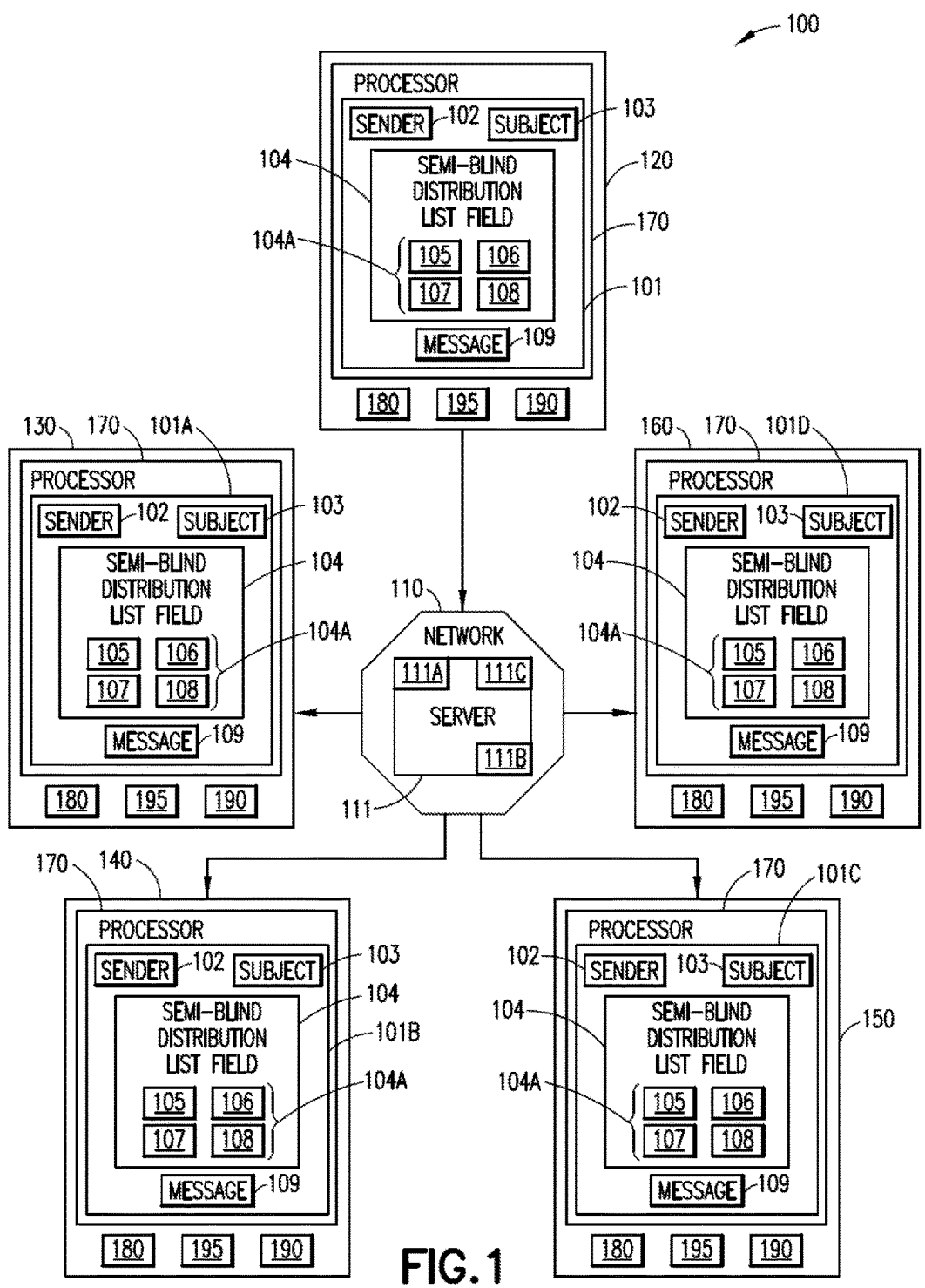
Figure 1A:
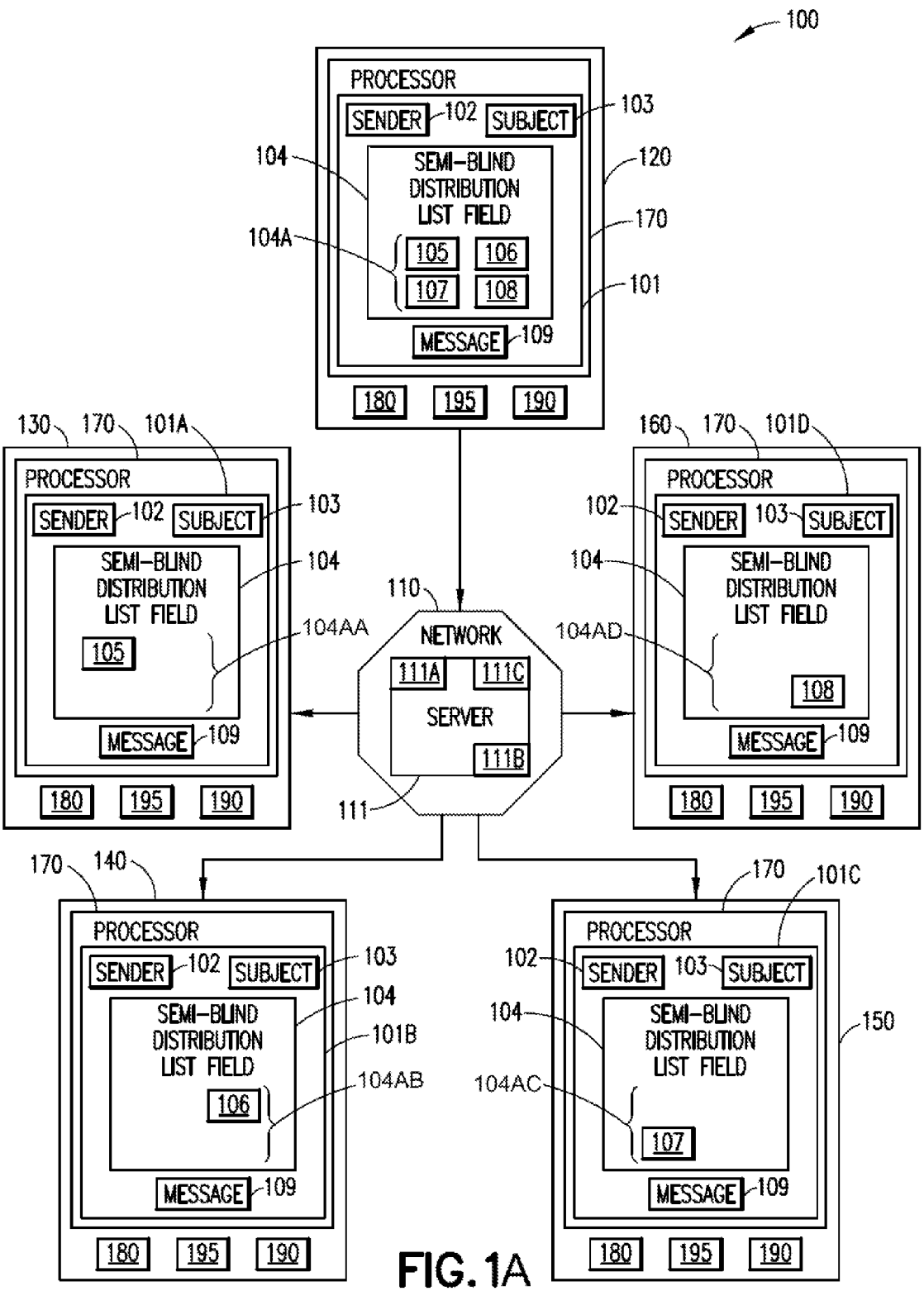
Figure 2:
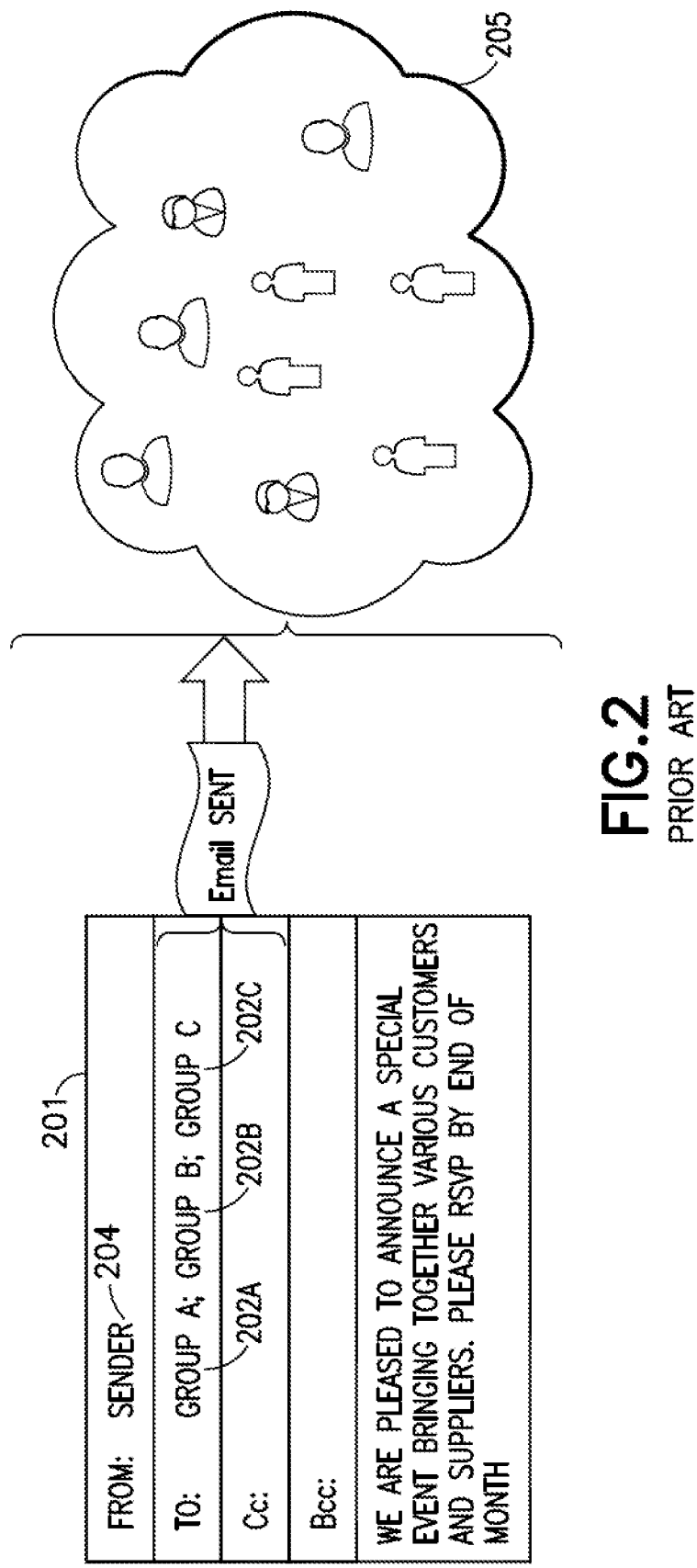
Figure 3:
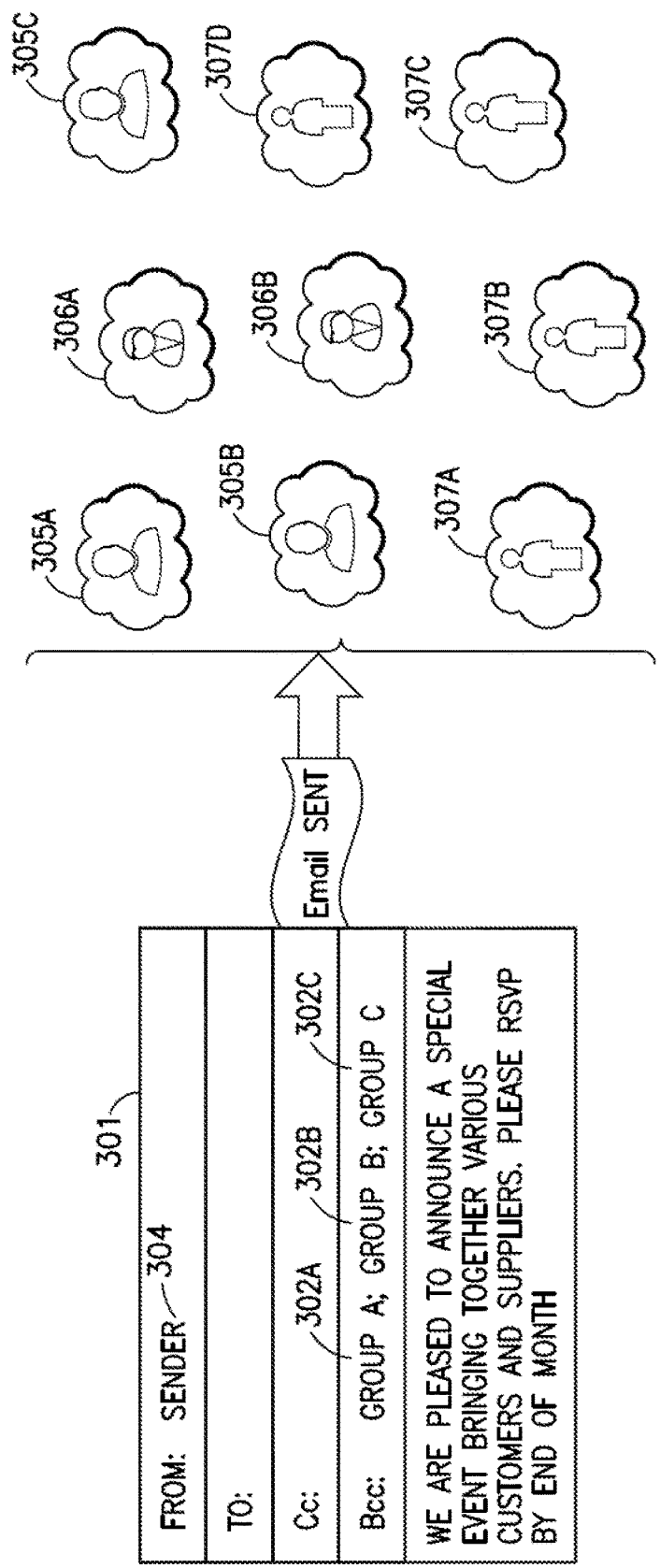
Figure 4:
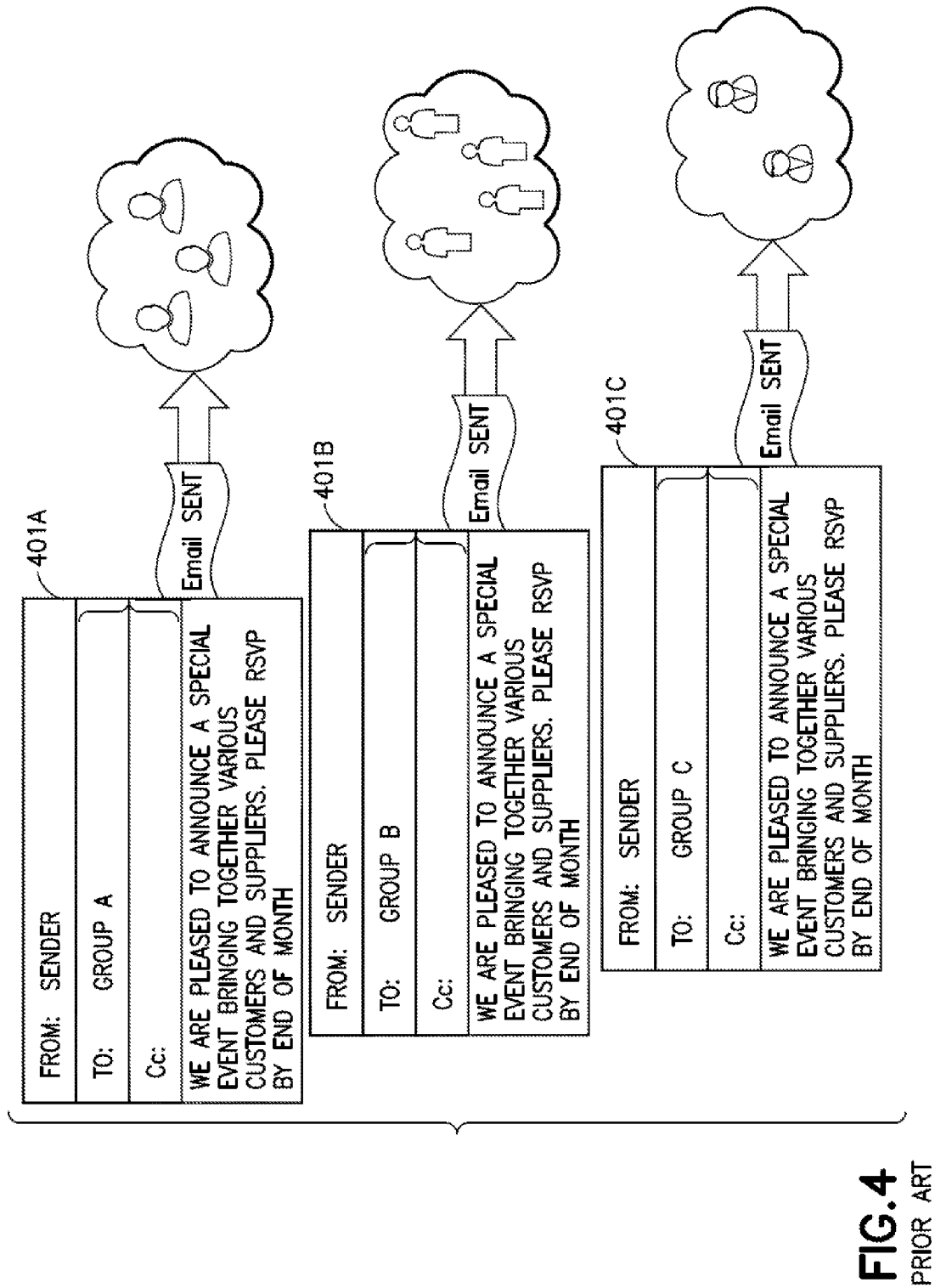
Figure 5:
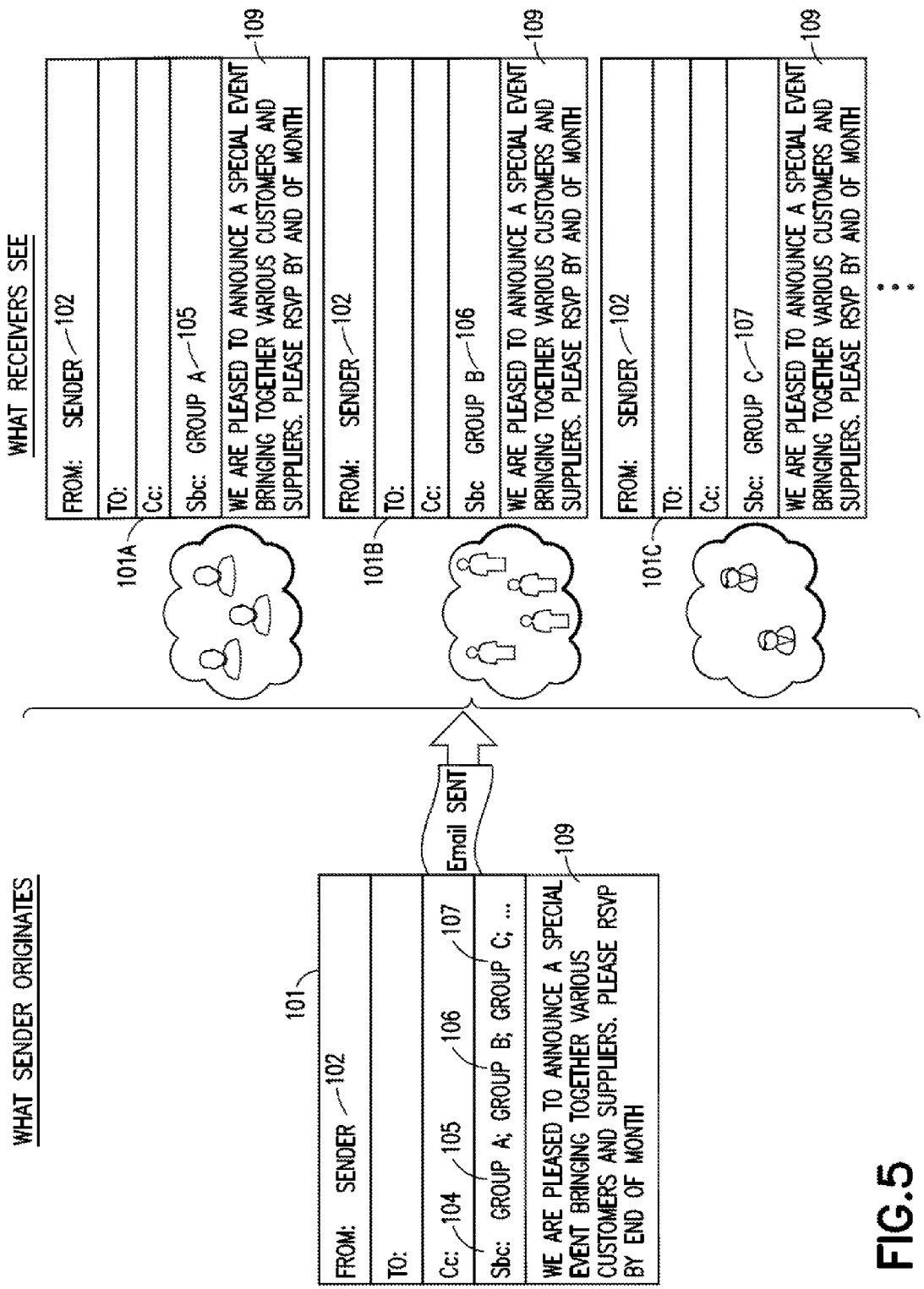
Figure 6:
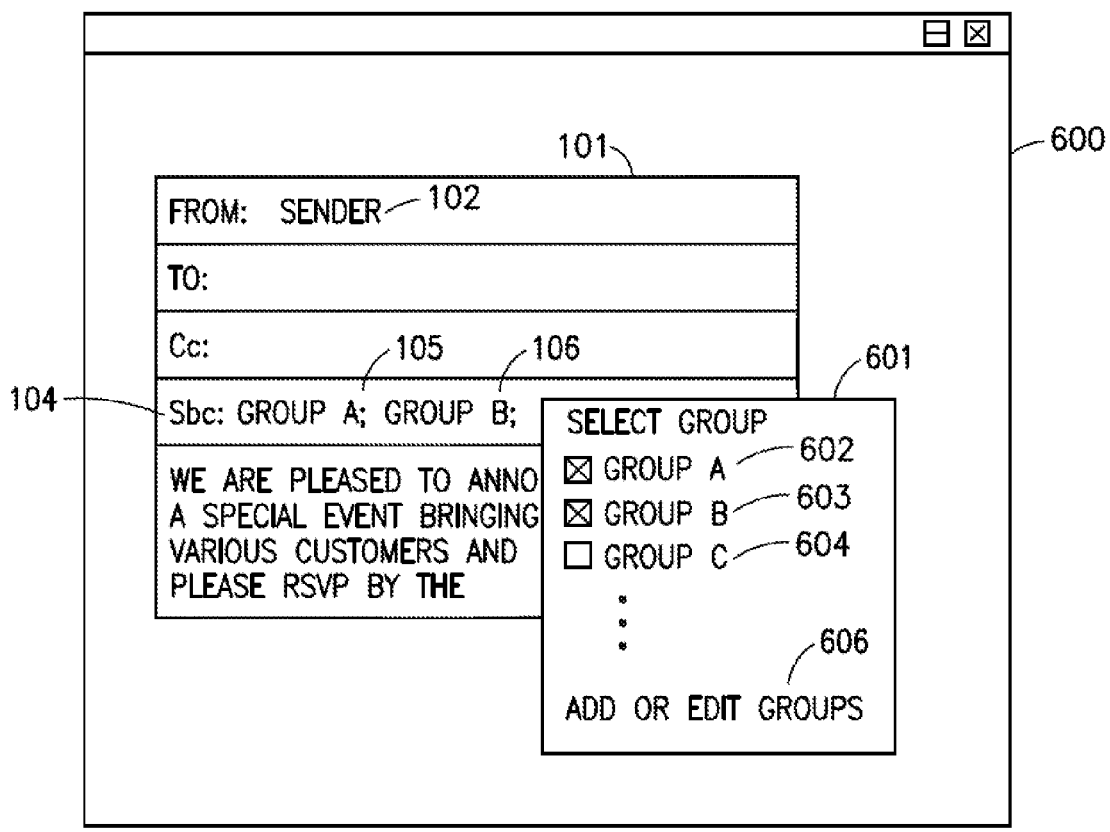
Figure 6A:
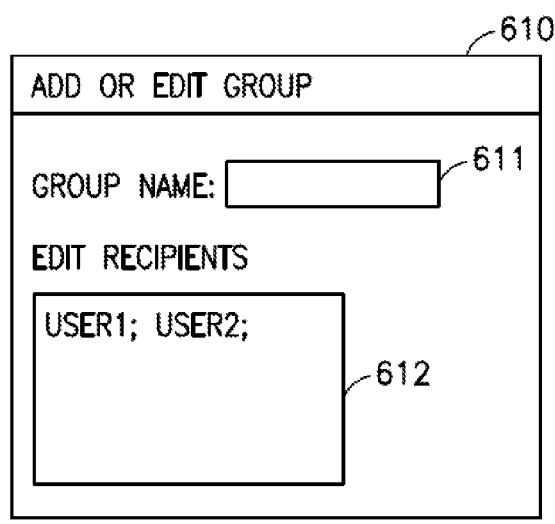
Figure 7:
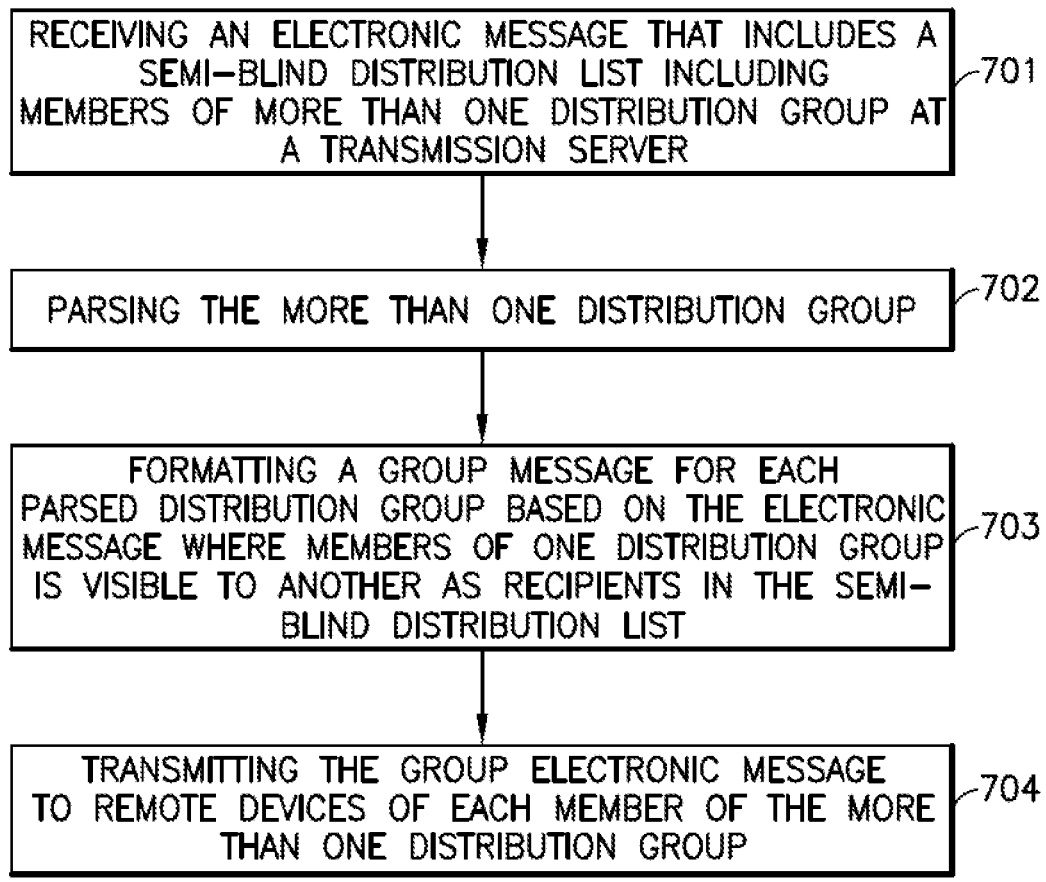
Figure 8:
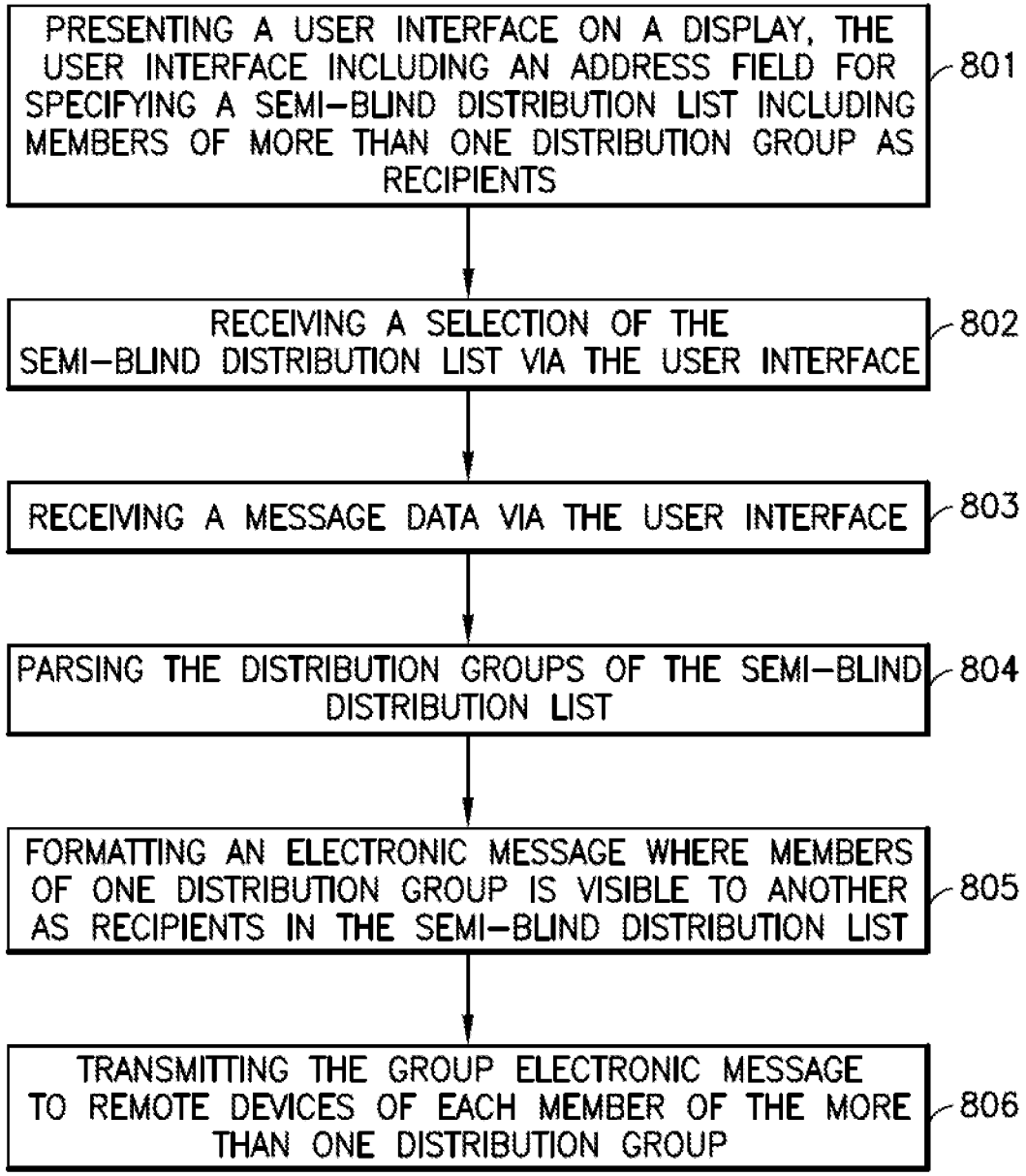
Figure 9:
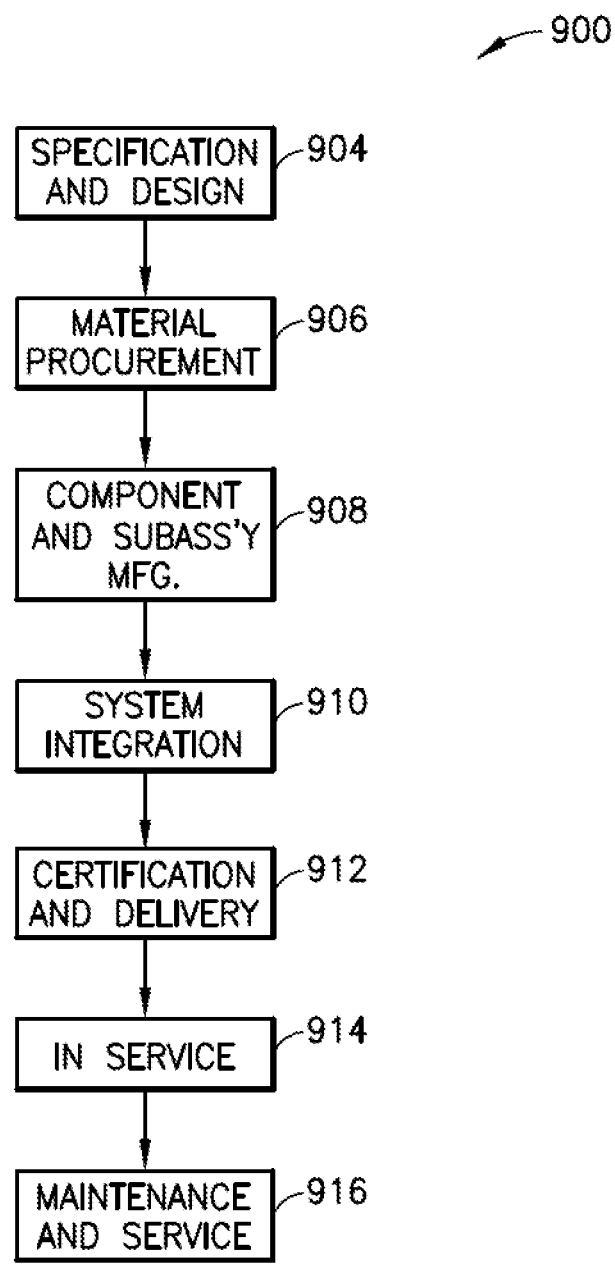
Figure 10:
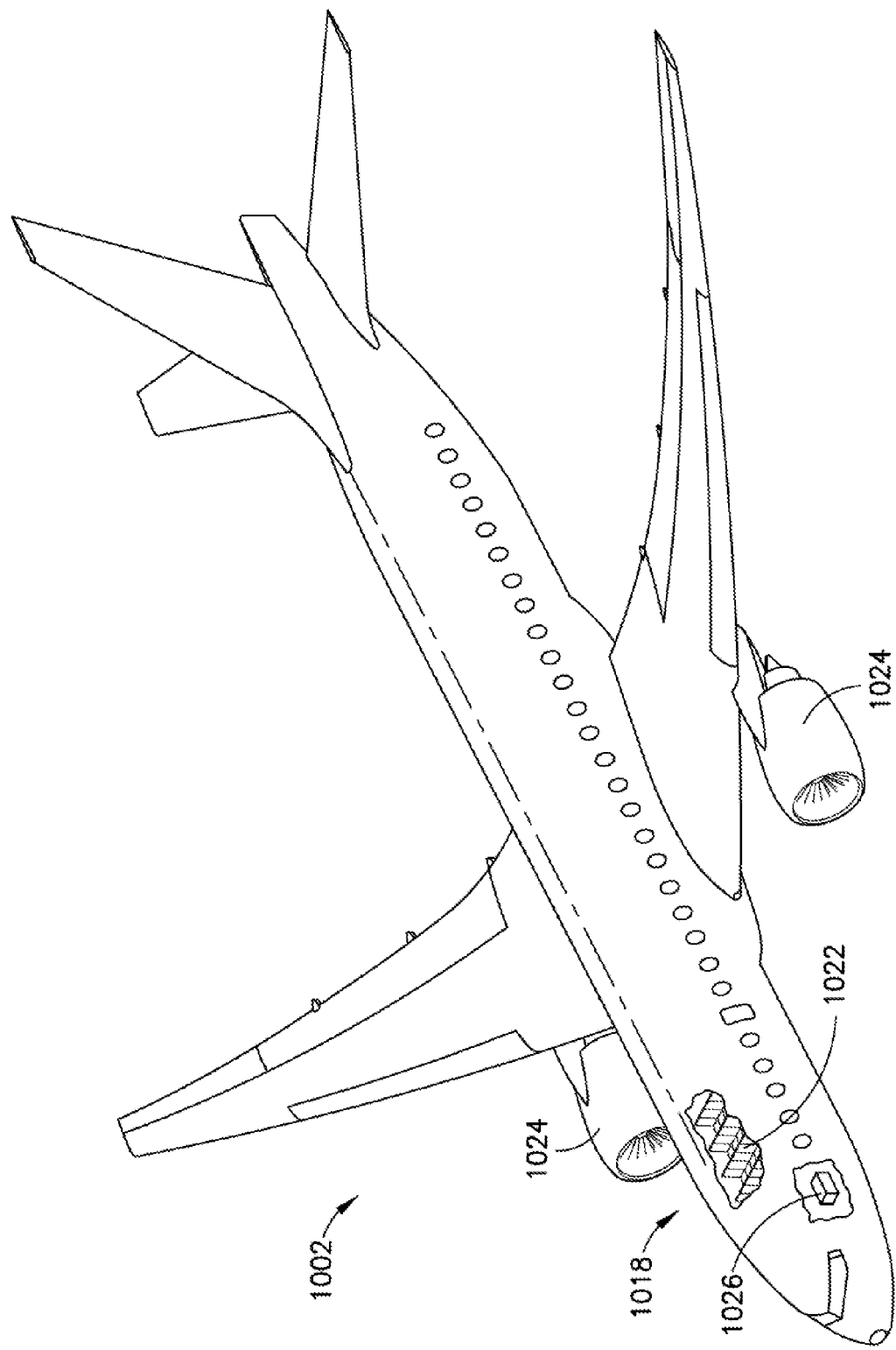

Having thus described examples of the disclosure in general terms, reference will now be made to the accompanying drawings, which are not necessarily drawn to scale, and wherein like reference characters designate the same or similar parts throughout the several views, and wherein:

FIG. 1 is an exemplary block diagram of the semi-blind electronic messaging system according to one or more aspects of the present disclosure;

FIG. 1A is an exemplary block diagram of the semi-blind electronic messaging system according to one or more aspects of the present disclosure;

FIGS. 2-4 are exemplary illustrations of prior art electronic messaging systems;

FIG. 5 is an exemplary illustration of a semi-blind electronic messaging system according to one or more aspects of the present disclosure;

FIGS. 6-6A are exemplary user interface diagrams of a semi-blind electronic messaging system according to one or more aspects of the present disclosure;

FIG. 7 is an exemplary method flow chart according to one or more aspects of the present disclosure;

FIG. 8 is an exemplary method flow chart according to one or more aspects of the present disclosure;

FIG. 9 is a flow diagram of aircraft production and service methodology in accordance with one or more aspects of the present disclosure; and FIG. 10 is a schematic illustration of an aircraft in accordance with one or more aspects of the present disclosure.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings or connections other than those depicted in the block diagrams may also exist. Dashed lines, if any, connecting the various elements and/or components represent couplings or connections similar in function and purpose to those represented by solid lines; however, couplings or connections represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting. It is further noted that all numbers, temperatures, etc. are "about" and provided for exemplary purposes only. All specific numbers, temperatures and any other specific information may be more or less or any suitable number or temperature.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Referring now to FIG. 1, a semi-blind electronic messaging system 100 according to one aspect of the present disclosure is shown. In one aspect, the semi-blind electronic messaging system 100 is made up of a number of client devices 120-160 (also referred to as remote devices), each connected to a network 110. In one aspect of the present disclosure, the client devices 120-160 send and receive semi-blind electronic messages 101, 101A-D between each other. In one aspect, semi-blind electronic messages 101, 101A-D are electronic messages where the recipients of the semi-blind electronic messages 101, 101A-D are visible to other recipients within the same distribution group, but invisible (e.g. not visible) to recipients in other distribution groups included in the same electronic message. In one aspect, the semi-blind electronic messages 101, 101A-D include emails, instant messages, text messages, calendar entries, meeting invitations, social media postings or any other electronic message capable of being sent to multiple recipients. For the purposes of simplicity, the terms "user" and "sender" are used interchangeably within this application.

Referring still to FIG. 1, in one aspect of the present disclosure, the client devices 120-160 are computing devices, such as, for example, desktop computers and laptop computers. In other aspects, the client devices 120-160 also include mobile devices such as tablets, smartphones, smart devices such as smart watches or smart glasses or any other suitable electronic device configured to send and receive semi-blind electronic messages 101 and 101A-D. Each of the client devices 120-160 also includes a processor 170 configured to execute non-transitory computer readable program code defining a user interface 600 stored on a device memory 195 to effect creation, transmission and receipt of the semi-blind electronic messages 101, 101A-D as disclosed herein. The processor 170 of each client device 120-160 also controls a display 190 to present semi-blind electronic messages 101 and 101A-D to a user. The client devices 120-160 are connected to the network 110 over a communication module 180, which allows for the semi-blind blind electronic messages 101, 101A-D to be passed between the client devices 120-160. In one aspect of the present disclosure, the network 110 is the Internet or World Wide Web. In other aspects, the network 110 is any suitable wired or wireless network including, for example, a company or organization intranet. In one aspect of the present disclosure, there is a transmission server or backend 111 which is accessible over the network 110.

In one aspect, the transmission server 111 is the server device through which the semi-blind electronic messages 101 and 101A-D are routed or passed through. For example, the transmission server 111 can be an email or calendar server (managing, for example, Microsoft Outlook® messages and calendar entries) or an instant messaging server. However, in other aspects, the transmission server 111 is a platform for other electronic messaging systems such as, for example, a backend for a social media network such as Facebook®, Twitter® or Instagram®. In one aspect, the transmission server 111 is a single device, however, in other aspects, there are multiple transmission servers or devices which handle the routing of the semi-blind electronic messages 101 and 101A-D. In one aspect, the transmission server 111 has a communication module 111A, which is configured to communicate over network 110. In one aspect, the transmission server 111 also has a server processor 111B, which is configured to control the functionality of the server 111. In one aspect, the transmission server 111 also has a server memory 111C that stores the semi-blind electronic messages 101 and 101A-D for processing by the transmission server 111 as will be described in greater detail below.

Referring to FIGS. 1 and 5, in one aspect, one or more of the client devices 120-160 is/are configured to generate the semi-blind electronic message 101 and send the semi-blind electronic message 101 via the communication module 180. In the exemplary aspect shown in FIG. 1, client device 120 is sending the semi-blind electronic message 101, where in this aspect, the client device 120 is a source device (e.g. the device from which the semi-blind electronic message 101 originates). However, in other aspects, any one or more of the client devices 120-160 can send the semi-blind electronic message 101 as a source device and any one or more client device 120-160 can receive a respective semi-blind electronic messages 101A-D, where the received semi-blind electronic messages 101A-D are referred to as semi-blind group electronic messages 101A-D and where the receiving devices are referred to as remote devices. In one aspect, the semi-blind electronic message 101 has a sender field 102 defining the sender of the semi-blind electronic message 101, a subject field 103 defining the subject of the semi-blind electronic message 101, and a message field 109 defining the message information of the semi-blind electronic message 101. The semi-blind electronic message 101 further has a semi-blind distribution list field 104, which, when specified by a user, includes the semi-blind distribution list 104A that has one or more distribution groups 105-108. In one aspect, each of the distribution groups 105-108 further includes one or more members or recipients within the distribution groups 105-108. For example, in one aspect, one distribution group 105-108 may be a mailing list for a company or organization, with each of the recipients defined within the distribution groups 105-108 being members or employees of a particular company or organization. In yet other aspects, the distribution groups 105-108 can be any arbitrarily defined group of message recipients. In one aspect, when the semi-blind electronic message 101 is sent by the sender, the members of each distribution group 105-108 will receive a respective semi-blind group electronic message 101A-101D, having identical subject matter but each having different listed recipients. In one aspect, the semi-blind distribution list field 104 allows the semi-blind electronic message 101 to be sent so that members of a common distribution group 105-108 within the semi-blind distribution list field 104 are visible to one another as recipients in the semi-blind distribution list 104A. Thus, for example, a member in distribution group 105 will receive a semi-blind group electronic message 101A, listing only the other members of distribution group 105 as the recipients. Further, in one aspect, the semi-blind distribution list field 104 also allows the semi-blind electronic message 101 to be sent so that at least one member of a first distribution group (for example, distribution group 105) is/are invisible to at least one member of a second distribution group (for example, distribution group 106) as recipients in the semi-blind distribution list 104A as illustrated in semi-blind electronic messages 101A-101D generated from the semi-blind electronic message 101. For example, in semi-blind electronic message 101B, the members of distribution groups 105, 107 and 108 are invisible to the members of distribution group 106. Thus, recipients that are within the same distribution group 105-108 will have visibility to the names, identities and email addresses of other recipients within that same distribution group while being invisible (e.g. names, identities and email addresses are not visible) to members of other distribution groups. The recipient of the semi-blind electronic message 101 (represented as semi-blind group electronic message 101A-D) will thus have functionality that is not available in conventional electronic messaging systems. For example, a member of distribution group 105 (representing a company) will now be aware of others within the same company that also received the same semi-blind group electronic message 101A. The member of the distribution group 105 can now communicate with other members of the distribution group 105 with regards to the semi-blind group electronic communication 101A with additional semi-blind electronic messages. The members of the distribution group 105 can view any comments or replies made by other members within the distribution group 105 to the sender of the original semi-blind electronic communication 101, allowing the members of the distribution group 105 to reply or forward the original semi-blind electronic communication to others within their organization and enable dialogue regarding an event or electronic message. However, in one aspect, the members of the distribution group 105 will have no information or awareness regarding other members or recipients in other distribution groups 106-108. The members of other distribution groups 106-108 are invisible to a recipient who is a member of the distribution group 105. Similarly, the members of each of distribution groups 106-108 are also unaware of members of the other distribution groups 105-108.

Referring still to FIG. 5, an illustrative example of the user interfaces that are presented to the sender of the semi-blind electronic message 101 and to the recipients of the semi-blind group electronic messages 101A-101C are shown in accordance with one aspect of the present disclosure. The semi-blind electronic message 101 composed by the sender includes the sender field 102, the message field 109 and the semi-blind distribution list field 104 as provided for in the user interface 600. In one aspect, the semi-blind distribution list field 104 includes semi-blind distribution listings of multiple distribution groups 105-107. In one aspect, the sender can edit or add distribution groups 105-107 (as will be described in greater detail below). The semi-blind electronic message 101 is then created by the source device, such as client device 120 for general sending by the client device 120 (e.g. the source device) based on the message data entered in the message data field 109 and the distribution groups 105-107 entered into the semi-blind distribution list field 104. After the semi-blind electronic message 101 is sent by the source device (e.g. client device 120), recipients receive respective semi-blind group electronic messages 101A-101C depending on which distribution group 105-107 they belong to as described herein. For example, in one aspect, recipients of semi-blind group electronic message 101A belonging to distribution group 105 will only be able to see other recipients within distribution group 105. Recipients within distribution groups 106-107 are invisible to recipients of semi-blind group electronic message 101A and vice versa. In one aspect, the semi-blind electronic message 101 is broken into the semi-blind group electronic messages 101A-D by either the client devices 120-160 (e.g. the source or remote devices) or the transmission server 111 as described herein.

Referring again to FIGS. 1 and 5, in one aspect, the semi-blind electronic messaging system 100 is implemented through specialized messaging clients in the form of non-transitory computer readable program code executed by the respective processors 170 on client machines 120-160. For example, a messaging client executed on client machine 120 enables a user to generate a semi-blind electronic message 101 that includes an additional field (e.g. the semi-blind distribution list field 104) reflecting the semi-blind distribution list 104A and the distribution groups 105-108 included in the semi-blind distribution list 104A. In one aspect, when the semi-blind electronic message 101 is sent to client machines 130-160 from client machine 120, the messaging client on client machines 130-160 takes the semi-blind electronic message 101 and strips or hides information related to distribution groups 105-108 that the user of client machines 130-160 is not a member of. The client machines 130-160 (representing receiving devices or remote devices) present the semi-blind group electronic messages 101A-101D to the users based on the user's membership in a particular distribution group 105-108. In another aspect, the semi-blind electronic messaging system 100 is implemented as an electronic messaging application plugin for an existing electronic messaging application executed as non-transitory computer readable program by the processor 170. For example, in one aspect, the semi-blind electronic messaging system 100 is implemented as a Microsoft Outlook® plugin, which inserts the semi-blind distribution list field 104 in, for example, emails and calendar invitations and provides for the creation of the semi-blind distribution lists 104A as described herein.

Referring to FIGS. 1A and 5, in one aspect, the semi-blind electronic messaging system 100 is implemented through specialized messaging clients in the form of non-transitory computer readable program code executed by the respective processors 170 on client machines 120-160. For example, a messaging client executed on client machine 120 enables a user to generate a semi-blind electronic message 101 that includes an additional field (e.g. the semi-blind distribution list field 104) reflecting the semi-blind distribution list 104A and the distribution groups 105-108 included in the semi-blind distribution list 104A. In one aspect, when the semi-blind electronic message 101 is sent to client machines 130-160 from client machine 120, the messaging client on client machine 120 takes the semi-blind electronic message 101 and strips or hides information (see semi-blind distribution list fields 104AA, 104AB, 104AC, 104AD presented in the respective semi-blind group electronic messages 101A-101D) related to distribution groups 105-108 that the user of client machines 130-160 is not a member of. The client machines 130-160 (representing receiving devices or remote devices) present the semi-blind group electronic messages 101A-101D to the users based on the user's membership in a particular distribution group 105-108. In another aspect, the semi-blind electronic messaging system 100 is implemented as an electronic messaging application plugin for an existing electronic messaging application executed as non-transitory computer readable program by the processor 170. For example, in one aspect, the semi-blind electronic messaging system 100 is implemented as a Microsoft Outlook® plugin, which inserts the semi-blind distribution list field 104 in, for example, emails and calendar invitations and provides for the creation of the semi-blind distribution lists 104A as described herein.

In yet another aspect, the semi-blind electronic messaging system 100 is implemented server-side by, for example, transmission server 111. For example, the semi-blind electronic message 101 is received by the transmission server 111 from the source device 120 via the network 110. In one aspect, the transmission server 111 receives the semi-blind electronic message 101 and parses the more than one distribution group 105-108 in the semi-blind distribution list field 104 of the semi-blind electronic message 101 to generate the respective semi-blind group electronic messages 101A-D corresponding to each of the distribution groups 105-108. In one aspect, the transmission server 111 dynamically formats the semi-blind group electronic messages 101A-D for each of the respective parsed distribution groups based on the semi-blind electronic message 101 where each semi-blind group electronic message 101A-D includes, as recipients, members of one of the parsed distribution groups and where the semi-blind group electronic message 101A-D is formatted so that members of a common distribution group 105-108 are visible to one another as recipients in the respective semi-blind group electronic message 101A-D. In one aspect, members of the common distribution group 105-108 are not visible (e.g. invisible) to members of other different distribution groups of the more than one distribution group. The transmission server 111 also transmits the respective semi-blind group electronic message 101A-D over the network to respective remote devices 130-160 belonging to members of each respective distribution group. By implementing the semi-blind messaging system 100 in the transmission server 111, systems where recipients do not have the requisite electronic messaging application plugin will still be able to participate in the semi-blind messaging system 100. In yet another aspect, a hybrid system is provided involving some client machines 120-160 executing a specialized messaging client or a message application plugin, while other client machines 120-160 have no specialized messaging client or message application plugin and rely on the transmission server 111 to generate the semi-blind group electronic messages 101A-D.

Referring now to FIGS. 6 and 6A, exemplary user interfaces for generating a semi-blind electronic message 101 is shown in accordance with an aspect of the present disclosure. In one aspect, a user interface 600 is presented by the processor 170 on the display 190 of a client device 120 (e.g. a source device). In one aspect, the user interface 600 is defined by non-transitory computer readable program code stored in device memory 195 and is presented on the display 190 when executed by the processor 170. The user interface 600 includes a semi-blind distribution list field 104 for specifying a semi-blind distribution list 104A including members of, for example, distribution groups 105-107. In one aspect, there is a dialogue box or window 601 on the user interface 600 which is configured so that a user selects different distribution groups 105-108 for the semi-blind distribution list 104A. For example, the user can select selectable elements 602-604, each corresponding to a respective distribution group 105-107 within the dialogue box 601. When the client device 120 receives a selection of the selectable elements 602-604 corresponding to the distribution groups 105-107, the client device 120 configures the semi-blind electronic message 101 to include the distribution groups 105-107 corresponding to the selection of selectable elements 602-604 so that members of a common distribution group will be visible to one another as recipients in the semi-blind distribution list 104A while being invisible to members of other distribution groups. In one aspect, a user can select a group editing selectable element 606 disposed in, e.g. the dialogue box 601, which initiates the group editing user interface 610 shown in FIG. 6A. In one aspect, the group editing user interface 610 is configured to provide the user with the option to define the members of the distribution groups 105-107 of the semi-blind distribution list 104A. In one aspect, the group editing user interface 610 has a group name field 611, which allows the user to edit and/or enter the name of a distribution group 105-107. In one aspect, the group editing user interface 610 also has a recipients field 612, wherein the user can add, edit or change the recipients of the distribution group. In one aspect, the recipients field 612 is represented as a text box, where a user can type contact information of recipients, while in other aspects, a user can interact with the recipients field 612 by selecting recipients from a list or any other suitable interface for selecting and defining recipients. In other aspects, the group editing user interface 610 also allows for a user to define a new distribution group of the semi-blind distribution list 104A. In one aspect, the user interface 600 also presents a message field 109 where message data is received by the processor 170 through the user interface 600. In one aspect, the user interface 600 further allows a sender to send the message defined in the user interface 600.

Referring now to FIGS. 1, 5 and 7, an exemplary flow chart of an aspect of the present disclosure is shown. At block 701, the transmission server 111 receives a semi-blind electronic message 101 from a client device 120 (e.g. the source device) over the network via the communication module 111A, the semi-blind electronic message 101 having the semi-blind distribution list 104A including members of more than one distribution group 105-107. At block 702, the transmission server 111 parses the more than one distribution group of the semi-blind electronic message 101. At block 703, the transmission server 111 formats a semi-blind group electronic message 101A-D for each of the parsed distribution groups 105-108 based on the semi-blind electronic message 101 where each semi-blind group electronic message 101A-D includes as recipients the members of a respective one of the parsed distribution groups. In one aspect, the semi-blind group electronic message 101A-D is formatted such that members of a common distribution group 105-108 are visible to one another as recipients in the semi-blind distribution list 104A. In one aspect, members of the common distribution group 105-108 are not visible as recipients to members of other different ones of the more than one distribution group 105-108. In one aspect, the server processor 111B of the transmission server 111 is configured to convert the semi-blind electronic message 101 to a respective semi-blind group electronic message 101A-D according to the recipient's membership in a respective distribution group 105-108. However, in other aspects, the server processor 111B receives separate semi-blind group electronic messages 101A-D from a sending client device 120-160 and forwards them to a respective recipient according to the recipient's membership in a respective distribution group 105-108 such as when the client devices 120-160 are capable of formatting the semi-blind group electronic messages 101A-101D as described herein. However, in yet other aspects, the transmission server 111 passes the semi-blind electronic message 101 to each recipient, where each respective recipient client device 120-160 formats the semi-blind group electronic message 101A-D for the group member of the respective recipient client device as described herein. For example, the recipient client device 120-160 may remove or hide recipients belonging to the distribution groups 105-108 that the recipient is not a member of from the respective semi-blind group electronic message 101A-D (e.g. the recipient remote device 120-160 formats the semi-blind group electronic messages 101A-D in a manner similar to that described herein with respect to the source device 120). At block 704, the semi-blind group electronic messages 101A-D are transmitted over the network 110 to each respective client devices 130-160 (e.g. remote devices) of each members of the more than one distribution groups. In one aspect, at least one member of a first distribution group is invisible to at least one member of a second distribution group as recipients of the semi-blind distribution list 104A. However, in other aspects, the first distribution group and its members are invisible to members of the second distribution group. In one aspect, as described herein, the client devices 120-160 also allows users to select members of a distribution group 105-108 of the semi-blind distribution list 104A to be blocked from view by another different distribution group 105-108.

Referring now to FIGS. 1, 5, 6, 6A and 8, another exemplary flow chart of an aspect of the present disclosure is shown. At block 801, a client device 120 (e.g. a source device) presents a user interface 600 on the display 190, the user interface 600 including an address field (e.g. a semi-blind distribution list field 104) specifying a semi-blind distribution list 104A including members of more than one distribution group 105-108 as recipients. At block 802, the client device 120 receives a selection of the semi-blind distribution list 104A through the user interface 600. At block 803, the client device 120 also receives message data entered into the message data field 109 from the user interface 600 of the client device 120. At block 804, the client device 120-160 (e.g. the source device or the remote device) parses the distribution groups 105-108 in the semi-blind distribution list 104A of the semi-blind electronic message 101. At block 805, the client device 120-160 (e.g. the source device or the remote device) formats a semi-blind group electronic message 101A-D based on the message data in message data field 109 and the distribution groups 105-108 in semi-blind distribution list 104A such that the members of a common distribution group 105-108 are visible to one another as recipients in the semi-blind distribution list 104A in a manner similar to that described herein with respect to the transmission server 111. In one aspect, a first distribution group 105-108 and its members are invisible to members of a second distribution group 105-108. In one aspect, the client devices 120-160 also allow users to select members of a distribution group 105-108 of the semi-blind distribution list field 104 to be blocked from view by another different distribution group 105-108 as described herein. At block 806, the semi-blind group electronic messages 101A-D are transmitted to remote devices of each member of the more than one distribution groups. In one aspect, the semi-blind electronic message 101 is broken up by the client device 120 (e.g. the source device) to a respective semi-blind group electronic message 101A-D for each respective distribution group 105-108. However, in other aspects, the semi-blind electronic message 101 is converted to a respective semi-blind electronic message 101A-D by the server 111 as described herein. In yet other aspects, the receiving client device 120-160 is configured to receive the semi-blind electronic message 101 and remove or hide recipients belonging to distribution groups 105-108 that the recipient is not a member of from each respective semi-blind electronic message 101A-D in a manner similar to that of the source device (e.g. client device 120) and as noted above.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 900 as shown in FIG. 9, an aircraft 1002 as shown in FIG. 10. In one aspect, semi-blind electronic messaging system 100 described herein can be employed, for instance, in any stage of aircraft manufacturing and design. During pre-production, illustrative method 900 may include specification and design 904 of the aircraft 1002 and material procurement 906, wherein the semi-blind electronic messaging system 100 is used to facilitate communication between different groups. During production, component and subassembly manufacturing 908 and system integration 910 of the aircraft 1002 take place, wherein the semi-blind electronic messaging system 100 is used to help individuals communicate with multiple teams and groups. The semi-blind electronic messaging system 100 described herein may be employed as part of the component and subassembly manufacturing process 908 used by managers with different component and subassembly manufacturing teams. Thereafter, the aircraft 1002 may go through certification and delivery 912 to be placed in service 914. While in service by a customer, the aircraft 1002 is scheduled for routine maintenance and service 916 (which may also include modification, reconfiguration, refurbishment, and so on).

Each of the processes of the illustrative method 900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 10, the aircraft 1002 produced by the illustrative method 900 may include an airframe 1018 with a plurality of high-level systems and an interior 1022. Examples of high-level systems include one or more of a propulsion system 1024, an electrical system 1026, a hydraulic system 1028, and an environmental system 1030. Although an aerospace example is shown, the principles of the invention may be applied to other industries, such as the automotive and maritime industries.

Apparatus and methods shown or described herein may be employed during any one or more of the stages of the manufacturing and service method 900. For example, components or subassemblies corresponding to component and subassembly manufacturing 908 may be fabricated or manufactured in a manner similar to components or subassemblies produced while the aircraft 1002 is in service. Also, one or more aspects of the apparatus, method, or combination thereof may be utilized during the production states 908 and 910, for example, by substantially expediting assembly of or reducing the cost of an aircraft 1002. Similarly, one or more aspects of the apparatus or method realizations, or a combination thereof, may be utilized, for example and without limitation, while the aircraft 1002 is in service, e.g., maintenance and service 916.

In accordance with one or more aspects of the present disclosure, a method for distributing electronic messages over a network to a remote device, the method includes receiving an electronic message at a transmission server sent from a source device over the network, the transmission server comprising a processor and a memory that stores the electronic message, where the electronic message includes a semi-blind distribution list including members of more than one distribution group, and with the processor parsing the more than one distribution group, formatting a group electronic message for each of the parsed distribution groups based on the electronic message where each group electronic message includes as recipients, members of a respective one of the parsed distribution groups and where the group electronic message is formatted such that members of a common distribution group of the more than one distribution group are visible to one another as recipients in the semi-blind distribution list, and transmitting a respective group electronic message over the network to respective remote devices of the members belonging to the more than one distribution group, and wherein the members of at least another distribution group different from the common distribution group are not visible in the respective group electronic message corresponding to the common distribution group.

In accordance with one or more aspects of the present disclosure, at least one member of the common distribution group is not visible to at least one member of the at least another distribution group as recipients of the group electronic message.

In accordance with one or more aspects of the present disclosure, with the processor, presenting the respective group electronic message to the members of the respective one of the parsed distribution groups.

In accordance with one or more aspects of the present disclosure, wherein the electronic message is one of an email, instant message, meeting invitation, text message or social media posting.

In accordance with one or more aspects of the present disclosure, the group electronic message is one of an email, instant message, meeting invitation, text message or social media posting.

In accordance with one or more aspects of the present disclosure, an apparatus for distributing electronic messages over a network to a remote device, the apparatus includes a transmission server configured to receive an electronic message sent from a source device over the network where the electronic message includes a semi-blind distribution list including members of more than one distribution group, the transmission server including a memory that stores the electronic message, and a processor configured to parse the more than one distribution group, format a group electronic message for each of the parsed distribution groups based on the electronic message where each group electronic message includes as recipients, members of a respective one of the parsed distribution groups and where the group electronic message is formatted such that members of a common distribution group of the more than one distribution group are visible to one another as recipients in the semi-blind distribution list, and transmit a respective group electronic message over the network to respective remote devices of the members belonging to the more than one distribution group, and wherein the members of at least another distribution group different from the common distribution group are not visible in the respective group electronic message corresponding to the common distribution group.

In accordance with one or more aspects of the present disclosure, at least one member of the common distribution group is not visible to at least one member of the at least another distribution group as recipients of the group electronic message.

In accordance with one or more aspects of the present disclosure, the processor is further configured to present the respective group electronic message to the members of the respective one of the parsed distribution groups.

In accordance with one or more aspects of the present disclosure, the electronic message is one of email, instant messages, meeting invitations, text messages or social media postings.

In accordance with one or more aspects of the present disclosure, the group electronic message is one of email, instant messages, meeting invitations, text messages or social media postings.

In accordance with one or more aspects of the present disclosure, a method for distributing electronic messages from a source device over a network to a remote device, the method includes presenting a user interface on a display of the source device, the source device comprising a memory that stores non-transitory computer readable program code defining the user interface and a processor that executes the non-transitory computer readable program code, the user interface including an address field for specifying a semi-blind distribution list including members of more than one distribution group as recipients, and with the processor receiving a selection of the semi-blind distribution list from the user interface of the source device, receiving message data from the user interface of the source device, formatting an electronic message based on the message data and the selection of the semi-blind distribution list such that members of a common distribution group of the more than one distribution group are visible to one another as recipients in the semi-blind distribution list, and transmitting the electronic message over the network to respective remote devices of members belonging to the more than one distribution group, wherein the members of at least another distribution group different from the common distribution group are not visible in the respective electronic message received by members of the common distribution group.

In accordance with one or more aspects of the present disclosure, the method further includes presenting on the display a distribution editing user interface for defining members of the each of the more than one distribution group.

In accordance with one or more aspects of the present disclosure, the method further includes selecting members of one distribution group to be blocked from view by another distribution group.

In accordance with one or more aspects of the present disclosure, the electronic message is one of an email, instant message, meeting invitation, text message or social media posting.

In accordance with one or more aspects of the present disclosure, an apparatus for distributing electronic messages over a network to a remote device, the apparatus includes a display, a memory that stores non-transitory computer readable program code defining a user interface, and a processor that executes the non-transitory computer readable program code, the processor being configured to present the user interface on the display, the user interface including an address field for specifying a semi-blind distribution list including members of more than one distribution group, receive a selection of the semi-blind distribution list from the user interface, receive message data from the user interface, format an electronic message based on the message data and the selection of the semi-blind distribution list such that members of a common distribution group of the more than one distribution group are visible to one another as recipients in the semi-blind distribution list, and transmit the electronic message over the network to respective remote devices of members belonging to more than one distribution group, wherein the members of at least another distribution group different from the common distribution group are not visible in the respective electronic message received by members of the common distribution group.

In accordance with one or more aspects of the present disclosure, the processor is further configured to present on the display a distribution editing user interface for defining members of each of the more than one distribution group.

In accordance with one or more aspects of the present disclosure, the processor is further configured to select members of one distribution group to be blocked from view by another distribution group.

In accordance with one or more aspects of the present disclosure, the electronic message is one of an email, instant message, meeting invitation, text message or social media posting.

In accordance with one or more aspects of the present disclosure, a non-transitory computer readable medium having computer readable program code embodied therein, stored in a memory of a source device, comprising computer readable code that, when executed, performs presenting a user interface on a display of the source device, the source device comprising a communications module, the user interface including an address field for specifying a semi-blind distribution list including members of more than one distribution group as recipients, receiving a selection of the semi-blind distribution list from the user interface of the source device, receiving message data from the user interface of the source device, formatting an electronic message based on the message data and the selection of the semi-blind distribution list such that members of a common distribution group of the more than one distribution group are visible to one another as recipients in the semi-blind distribution list, and transmitting the electronic message over the network to respective remote devices of members belonging to the more than one distribution group wherein the members of at least another distribution group different from the common distribution group are not visible in the respective electronic message corresponding to the common distribution group.

In accordance with one or more aspects of the present disclosure, when executed, the computer readable code further performs presenting on the display a distribution editing user interface for defining members of each of the more than one distribution group.

In accordance with one or more aspects of the present disclosure, the computer readable code is configured as an electronic messaging application plugin.

In accordance with one or more aspects of the present disclosure, when executed, the computer readable code further performs effecting selecting members of one distribution group to be blocked from view by another distribution group.

In accordance with one or more aspects of the present disclosure, the electronic message is one of an email, instant message, meeting invitation, text message or social media posting.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A method for distributing electronic messages over a network to a remote device, the method comprising:
    receiving an electronic message at a transmission server sent from a source device by a source user over the network, the transmission server comprising a processor and a memory that stores the electronic message, where the electronic message includes a semi-blind distribution list including more than one distribution group provided in a common semi-blind distribution address field of the electronic message where the common semi-blind distribution address field is separate and distinct from other address fields of the electronic message, each distribution group including respective members, and with the processor
    parsing the more than one distribution group from the common semi-blind distribution address field of the electronic message;
    formatting a group electronic message for each of the parsed distribution groups based on the electronic message where each group electronic message includes as recipients, members of a respective one of the parsed distribution groups and where the group electronic message is formatted such that members of a common distribution group of the more than one distribution group are visible to one another as recipients in the semi-blind distribution list; and
    transmitting a respective group electronic message over the network to respective remote devices of the members belonging to the more than one distribution group; and
    wherein
        the members of at least another distribution group different from the common distribution group are not visible in the respective group electronic message corresponding to the common distribution group, and
        the processor is configured to format a reply, in response to the group electronic message, from one of the members of the common distribution group as a semi-blind reply to the source user and the members of the common distribution group where the members of the at least another distribution group are hidden and remain invisible to the one of the members of the common distribution group.

2. The method of claim 1, wherein at least one member of the common distribution group is not visible to at least one member of the at least another distribution group as recipients of the group electronic message.

3. The method of claim 1, the method further comprising, with the processor, presenting the respective group electronic message to the members of the respective one of the parsed distribution groups.

4. The method of claim 1, wherein the electronic message is one of an email, instant message, meeting invitation, text message or social media posting.

5. The method of claim 1, wherein the group electronic message is one of an email, instant message, meeting invitation, text message or social media posting.

6. An apparatus for distributing electronic messages over a network to a remote device, the apparatus comprising:
  a transmission server configured to receive an electronic message sent from a source device by a source user over the network where the electronic message includes a semi-blind distribution list including more than one distribution group provided in a common semi-blind distribution address field of the electronic message where the common semi-blind distribution address field is separate and distinct from other address fields of the electronic message, each distribution group including respective members, the transmission server including
    a memory that stores the electronic message; and
    a processor configured to
      parse the more than one distribution group from the common semi-blind distribution address field of the electronic message;
      format a group electronic message for each of the parsed distribution groups based on the electronic message where each group electronic message includes as recipients, members of a respective one of the parsed distribution groups and where the group electronic message is formatted such that members of a common distribution group of the more than one distribution group are visible to one another as recipients in the semi-blind distribution list; and
      transmit a respective group electronic message over the network to respective remote devices of the members belonging to the more than one distribution group; and
    wherein
      the members of at least another distribution group different from the common distribution group are not visible in the respective group electronic message corresponding to the common distribution group, and the processor is configured to format a reply, in response to the group electronic message, from one of the members of the common distribution group as a semi-blind reply to the source user and the members of the common distribution group where the members of the at least another distribution group are hidden and remain invisible to the one of the members of the common distribution group.

7. The apparatus of claim 6, wherein at least one member of the common distribution group is not visible to at least one member of the at least another distribution group as recipients of the group electronic message.

8. The apparatus of claim 6, wherein the processor is further configured to present the respective group electronic message to the members of the respective one of the parsed distribution groups.

9. The apparatus of claim 6, wherein the electronic message is one of email, instant messages, meeting invitations, text messages or social media postings.

10. The method of claim 6, wherein the group electronic message is one of email, instant messages, meeting invitations, text messages or social media postings.

11. A method for distributing electronic messages from a source device over a network to a remote device, the method comprising:
  presenting a user interface on a display of the source device, the source device comprising a memory that stores non-transitory computer readable program code defining the user interface and a processor that executes the non-transitory computer readable program code, the user interface including a common semi-blind distribution address field for specifying a semi-blind distribution list including more than one distribution group as recipients, each distribution group including respective members; and
  with the processor
    receiving a selection of the more than one distribution group of the semi-blind distribution list, in the common semi-blind distribution address field, from the user interface of the source device;
    presenting, in the user interface, in response to entry of the more than one distribution group in the common semi-blind distribution address field corresponding to the semi-blind distribution list, a distribution editing user interface for defining members of each of the more than one distribution group;
    receiving message data from the user interface of the source device;
    formatting an electronic message based on the message data and the selection of the more than one distribution group of the semi-blind distribution list in the common semi-blind distribution address field such that members of a common distribution group of the more than one distribution group are visible to one another as recipients of the electronic message in the semi-blind distribution list and visible to one another as recipients in a semi-blind reply to the electronic message from one member of the common distribution group; and
    transmitting the electronic message over the network to respective remote devices of members belonging to the more than one distribution group;
  wherein processor formats the electronic message so that the members of at least another distribution group different from the common distribution group are not visible in the respective electronic message received by members of the common distribution group and the processor formats the semi-blind reply, from the one member of the common distribution group, so that the members of the at least another distribution group are hidden and remain invisible to the one member of the common distribution group.

12. The method of claim 11, further comprising selecting members of one distribution group to be blocked from view by another distribution group.

13. The method of claim 11, wherein the electronic message is one of an email, instant message, meeting invitation, text message or social media posting.

14. The method of claim 11, wherein the common address field for specifying the semi-blind distribution list is separate and distinct from other address fields of the electronic message.

15. An apparatus for distributing electronic messages over a network to a remote device, the apparatus including:
  a display;
  a memory that stores non-transitory computer readable program code defining a user interface; and a processor that executes the non-transitory computer readable program code, the processor being configured to present the user interface on the display, the user interface including a common semi-blind distribution address field for specifying a semi-blind distribution list including more than one distribution group, each distribution group having respective members;

receive a selection of the more than one distribution group of the semi-blind distribution list, in the common semi-blind distribution address field, from the user interface;

present, in the user interface, in response to the selection of the more than one distribution group in the common semi-blind distribution address field corresponding to the semi-blind distribution list, a distribution editing user interface for defining members of each of the more than one distribution group;

receive message data from the user interface;

format an electronic message based on the message data and the selection of the more than one distribution group of the semi-blind distribution list in the common semi-blind distribution address field such that members of a common distribution group of the more than one distribution group are visible to one another as recipients of the electronic message in the semi-blind distribution list and visible to one another as recipients in a semi-blind reply to the electronic message from one member of the common distribution group; and transmit the electronic message over the network to respective remote devices of members belonging to more than one distribution group;

wherein the processor formats the electronic message so that the members of at least another distribution group different from the common distribution group are not visible in the respective electronic message received by members of the common distribution group and the processor formats the semi-blind reply, from the one member of the common distribution group, so that the members of the at least another distribution group are hidden and remain invisible to the one member of the common distribution group.

16. The apparatus of claim 15, wherein the processor is further configured to select members of one distribution group to be blocked from view by another distribution group.

17. The apparatus of claim 15, wherein the electronic message is one of an email, instant message, meeting invitation, text message or social media posting.

18. A non-transitory computer readable medium having computer readable program code embodied therein, stored in a memory of a source device, comprising computer readable code that, when executed, performs:

presenting a user interface on a display of the source device, the source device comprising a communications module, the user interface including a common semi-blind distribution address field for specifying a semi-blind distribution list including more than one distribution group as recipients, each distribution group including respective members;

receiving a selection of the more than one distribution group of the semi-blind distribution list, in the common semi-blind distribution address field, from the user interface of the source device;

receiving message data from the user interface of the source device;

presenting, in the user interface, in response to entry of the more than one distribution group in the common semi-blind distribution address field corresponding to the semi-blind distribution list, a distribution editing user interface for defining members of each of the more than one distribution group;

formatting an electronic message based on the message data and the selection of the more than one distribution group of the semi-blind distribution list in the common semi-blind distribution address field such that members of a common distribution group of the more than one distribution group are visible to one another as recipients of the electronic message in the semi-blind distribution list and visible to one another as recipients in a semi-blind reply to the electronic message from one member of the common distribution group; and transmitting the electronic message over the network to respective remote devices of members belonging to the more than one distribution group wherein the computer readable code, when executed, formats the electronic message so that the members of at least another distribution group different from the common distribution group are not visible in the respective electronic message corresponding to the common distribution group and the computer readable code, when executed, formats the semi-blind reply, from the one member of the common distribution group, so that the members of the at least another distribution group are hidden and remain invisible to the one member of the common distribution group.

19. The apparatus of claim 15, wherein the common address field for specifying the semi-blind distribution list is separate and distinct from other address fields of the electronic message.

20. The computer readable code of claim 18, wherein the computer readable code is configured as an electronic messaging application plugin.

* * * * *